United States Patent [19]
Clarkson

[11] 3,945,604
[45] Mar. 23, 1976

[54] PACKINGLESS GATE VALVE AND ACTUATOR ASSEMBLIES

[75] Inventor: Curtis W. Clarkson, Palo Alto, Calif.

[73] Assignee: The J. R. Clarkson Company, Palo Alto, Calif.

[22] Filed: Apr. 11, 1974

[21] Appl. No.: 459,949

[52] U.S. Cl. ............... 251/174; 251/326; 251/328
[51] Int. Cl.² ......................................... F16K 3/02
[58] Field of Search ........... 251/326, 328, 174, 170, 251/203; 138/94.3, 94.5, 94

[56] References Cited
UNITED STATES PATENTS

| | | | |
|---|---|---|---|
| 2,732,170 | 11/1956 | Shand | 251/174 X |
| 3,350,056 | 10/1967 | Blumenkranz | 251/328 X |

FOREIGN PATENTS OR APPLICATIONS

| | | | |
|---|---|---|---|
| 121,503 | 4/1948 | Sweden | 251/326 |

*Primary Examiner*—Arnold Rosenthal
*Attorney, Agent, or Firm*—Strauch, Nolan, Neale, Nies & Kurz

[57] ABSTRACT

A packingless gate valve having a stepped through passage defined by respective half housings formed with passages of different diameter and respective bolt connector flanges disposed in face to face relation with spacer strips interposed between diametrically opposite flange face margins to define a laterally related gate passage, a compressible elastomeric liner sleeve fitted to the passage of greater diameter with its opposite ends protruding axially from the passage ends and the end opposed to the flange face defining the end of the smaller diameter passage formed to span the gate passage and provide a protruding lip sealingly engaging the last mentioned flange face in annular surrounding relation to the smaller diameter passage end, a gate having a leading knife edge slidingly mounted in the gate passage with the lead tip of the knife edge disposed to enter the line of seal and deform the lip into sealing engagement with the opposed face of the knife edge and gate in its reciprocal movement in the gate passage, and actuator means operatively supported by the connector flanges and connected to the gate to effect controlled movement of the gate between its open and closed positions. The packingless gate valve is adapted for spigot or take off point mounting relative to a pipe line sidewall passage by means of a suitably formed saddle and pipe wall sealing gasket clampingly disposed between the pipe outer wall and the opposite end of the housing defining the larger diameter through passage by pipe encircling straps connected to the corners of the housing connector flanges by suitable draw bolt and nut assemblies.

13 Claims, 16 Drawing Figures

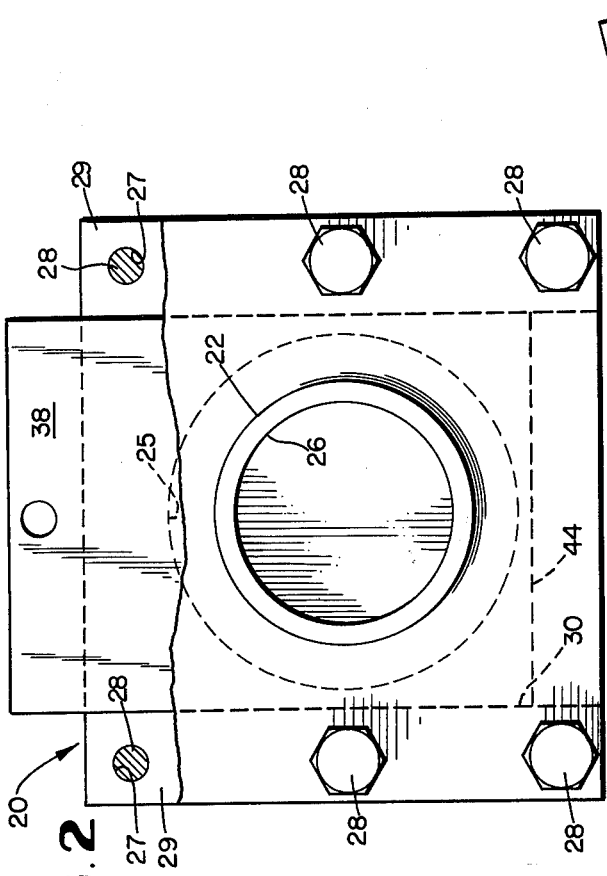
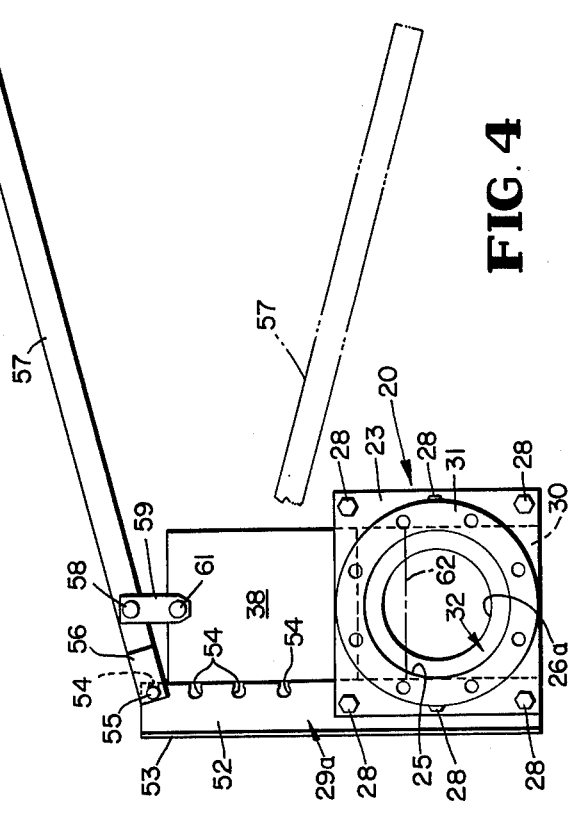
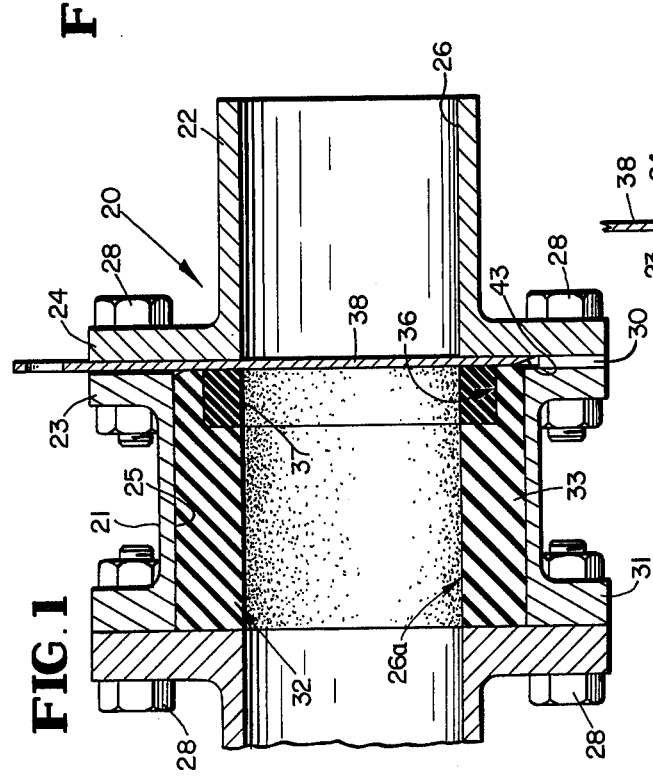
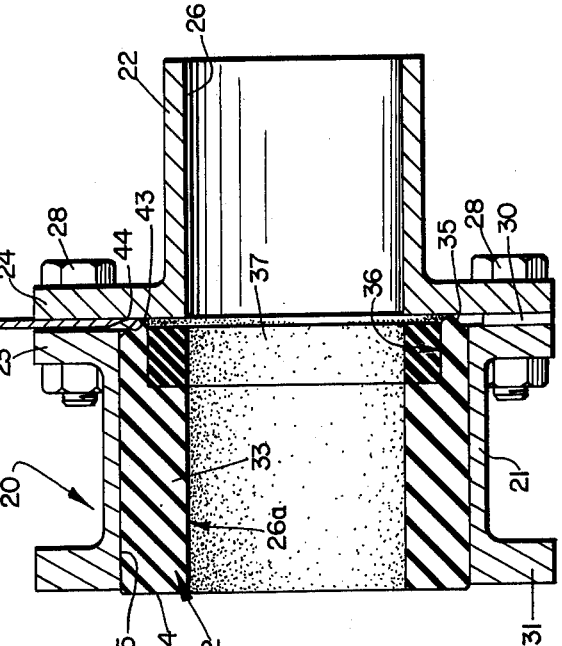
FIG. 1
FIG. 2
FIG. 3
FIG. 4

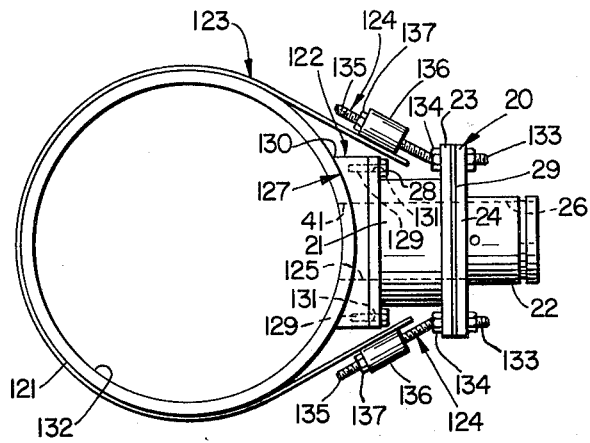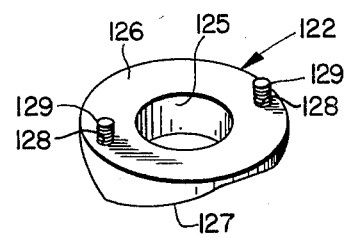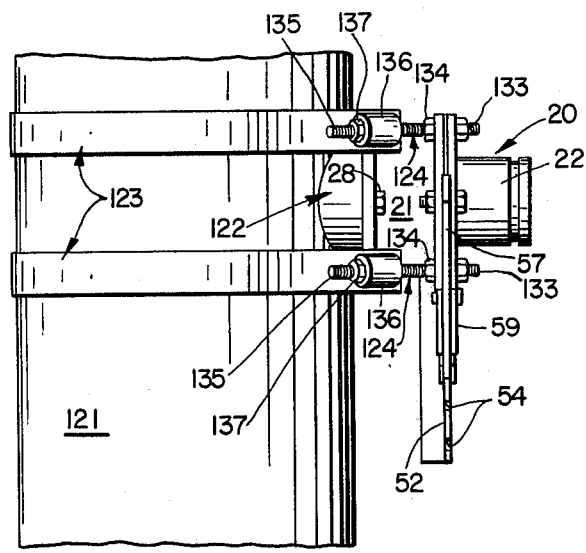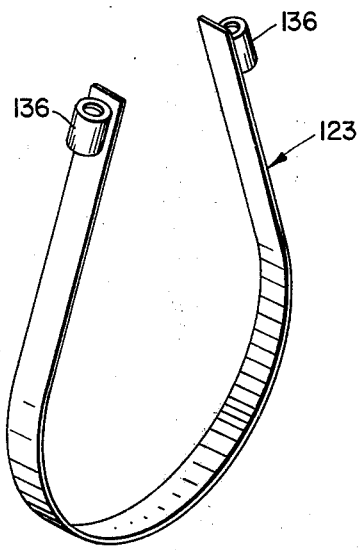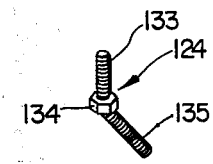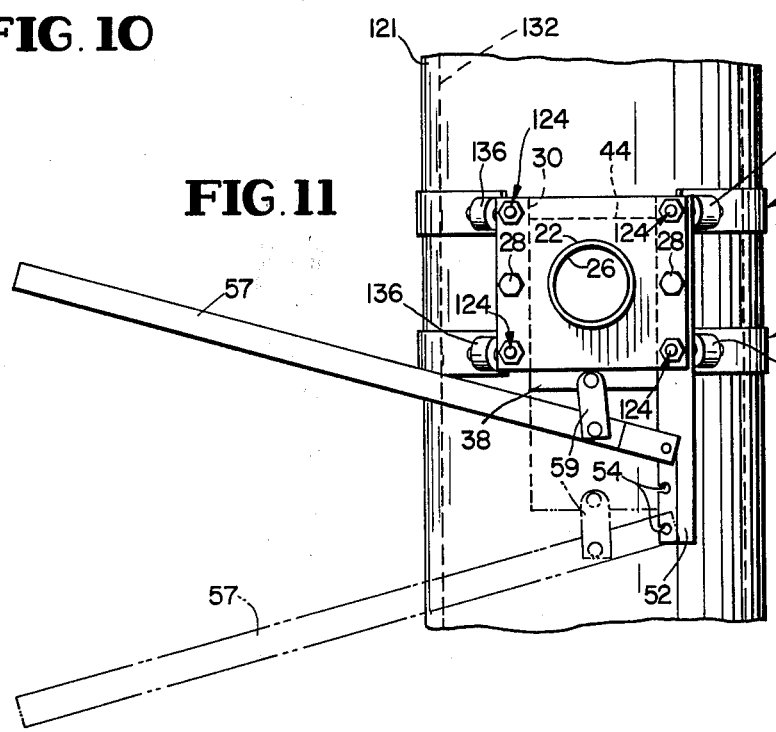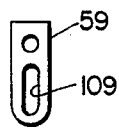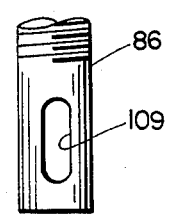

PACKINGLESS GATE VALVE AND ACTUATOR ASSEMBLIES

BACKGROUND OF INVENTION

The present invention relates in general to an improvement in gate valves which assures full through flow with no line obstruction when fully open and eliminates the need of packing, stuffing boxes, and packing glands to prevent leakage in any of its selected control positions whether used as an in-line shut-off valve or as a spigot or take-off point valve mounted on the side of a pipeline. While intended primarily for the control of abrasive slurries, including tailings, spigotting, hydrocyclone feed shut-off valving, slurry pump isolation, and dump valve applications, the valve can be used wherever gate valve control may be desired to close against line pressures up to 100 pounds per square inch. It further provides a face-to-face dimension equal to that of a standard 125 lb. gate valve, employees an inlet flange connection meeting 150 lb. ASTM-A181 Grade 1 Specifications and optional outlet connections of flange, Victaulic or plain end type meeting these same specifications. It further accomodates lever, handwheel, or air cylinder actuators with equal facility.

SUMMARY OF INVENTION

A principal object of the present invention resides in the provision of a gate valve employing an internal seal which is abrasion resistant and eliminates the need of packing, stuffing boxes or packing glands to prevent leakage in any selected control position.

A further important object of the present invention resides in the provision of a gate valve comprising a first half housing and a second half housing each having a bolt receiving connector flange at one end adapting said half housings for interconnection with their said flange end faces along diametrically opposed marginal portions in abutting clamped engagement with the opposed faces of respective spacer strips defining between them a gate passage, said first half housing defining a through flow passage of greater diameter than the flow passage defined by said second half housing, both said flow passages intersecting said gate passage inwardly of said spacer strips to form a coaxial stepped through flow passage, a soft sleeve-like elastomeric liner defining a flow passage substantially equal in diameter to the passage of said second housing half disposed in said flow passage of greater diameter with one end formed to provide an axially protruding annular sealing lip abuttingly sealingly engaging the flange face of said second half housing radially outwardly of its coaxial flow passage and its opposite end projecting slightly beyond the opposite end of said greater diameter flow passage, and a plate-like gate disposed in said gate passage for sliding movement inwardly from one open end of said gate passage and bevelled along its leading end to form a knife edge disposed to enter between said annular sealing lip and the flange face of said second half housing and progressively shift said annular sealing lip into sealing engagement with said knife edge and the face of said gate remote from said second half housing flange face.

A further object of this invention resides in providing said one end of the sleeve-like elastomeric liner of the proceeding object with an internal annular recess inset longitudinally relative to said annular sealing lip to receive in surface bonded assembly an elastomeric ring of greater hardness operative to rigidify said liner one end inwardly of said annular sealing lip against localized deformation.

Still another object of the present invention resides in providing adapter support means for mounting gate actuators on said half housing connector flanges.

BRIEF DESCRIPTION OF THE DRAWINGS

Further objects will appear from the following description and appended claims when read in conjunction with the accompanying drawings wherein:

FIG. 1 is a longitudinal section through a typical valve constructed in accord with this invention showing the gate in fully closed position and omitting therefrom any illustration of a gate actuator;

FIG. 2 is an end elevational view of the valve of FIG. 1 as viewed from the right end of FIG. 1;

FIG. 3 is a longitudinal sectional view similar to FIG. 1 showing the sealing sleeve in full sealing engagement with the flange face of the right end half housing with the gate leading edge disposed in its fully open position;

FIG. 4 is a left end elevational view of the valve of FIG. 1 assembled with a lever actuator in accord with this invention;

FIG. 9 is a transverse sectional view through a pipeline illustrating the valve assembly of FIG. 4 installed as a spigot or take-off point valve;

FIG. 10 is a top plan view of the valve installation of FIG. 9;

FIG. 11 is a side elevational view of the valve installation of FIG. 9 as viewed from the right side of FIG. 9;

FIG. 12 is a perspective view of the pipeline saddle mount provided to effect the spigot or take-off point valve assembly of FIG. 9;

FIG. 13 is a perspective view of one of the pair of attachment straps employed in the assembly of FIG. 9;

FIG. 14 is a perspective view of one of the four draw bolts employed in the assembly of FIG. 9 to draw the gate valve of this invention and the saddle mount into clamped sealing engagement and sealingly secure the saddle mount of FIG. 12 around the sidewall outlet opening provided in the pipeline in effecting the valve installation of FIG. 9; and FIGS. 15 and 16 disclose respectively a slotted link and a slotted actuator screw or stem for use in the actuators of FIGS. 4 and 6.

DESCRIPTION OF PREFERRED EMBODIMENT

Figures 5, 6:
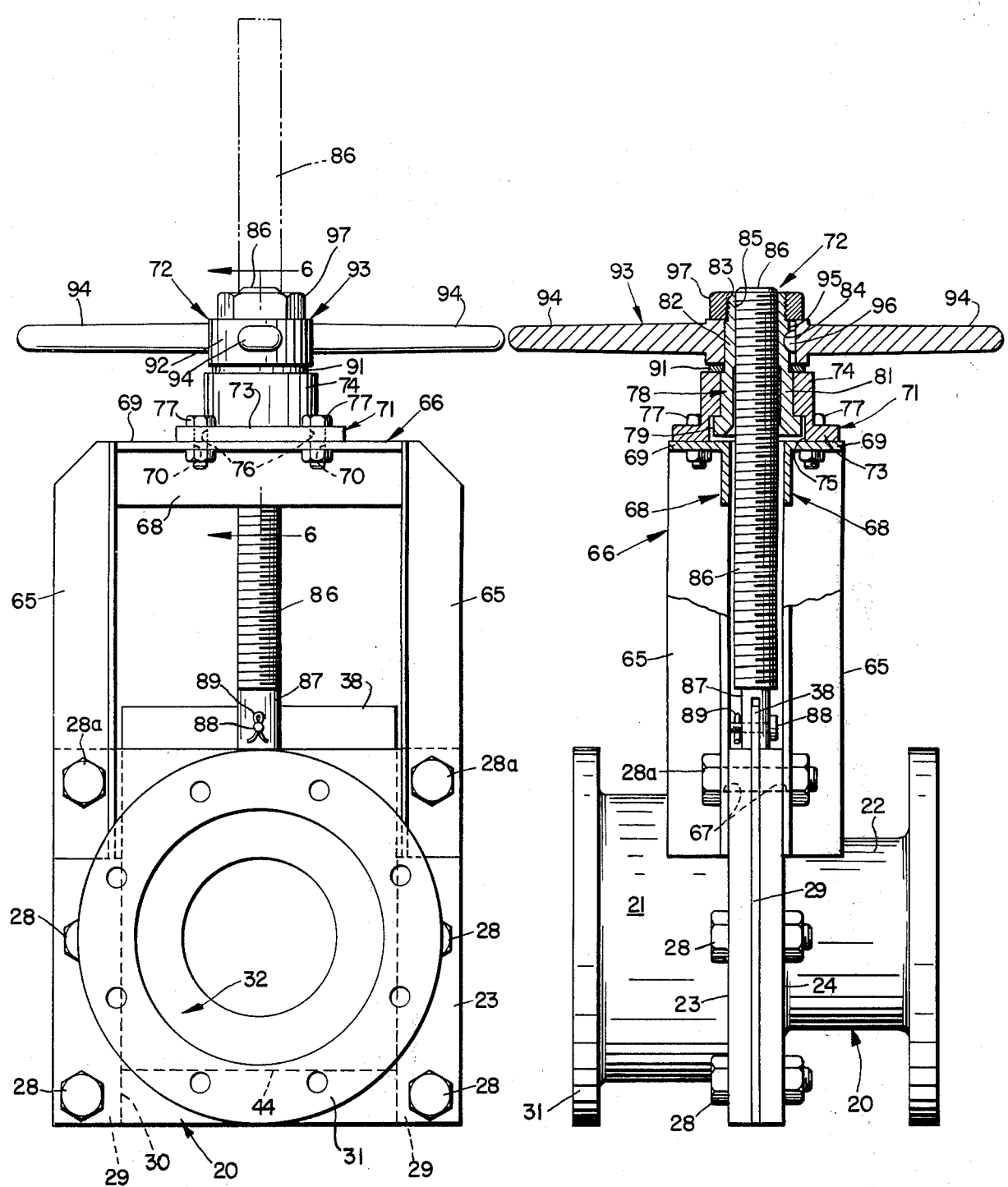
FIG. 5 is a left end elevational view of the valve of FIG. 1 assembled with a handwheel driven screw actuator in accord with this invention.
FIG. 6 is a side elevational view of the assembly of FIG. 5 with the near side angle irons of the support structure broken away and the handwheel drive and nut assembly and horizontal angle irons sectioned along line 6-6 of FIG. 5 to illustrate the mounting of the drive nut assembly on the support structure employed in the screw actuator.

With continued reference to the drawings wherein the same reference numerals are employed throughout the several views to indicate the same parts, numeral 20 generally designates the improved gate valve of this invention. Gate valve 20 is made up of a pair of half housings 21 and 22 provided at their adjacently connected ends with respective bolt connector flanges 23 and 24 and respectively defining through longitudinal passages 25 and 26. As best seen in FIGS. 1 and 3, the passages 25 and 26 are centered with relation to the flange edges and passage 25 of half housing 21 is of greater diameter than passage 26 of housing half 22 the purpose of which will be hereinafter pointed out.

Referring for the moment to FIG. 2, bolt connector flanges 23 and 24, laterally outwardly of passage 25 of greater diameter, are provided with oppositely laterally aligned bolt passages 27 for receiving the shanks of respective nut and bolt assemblies 28 to clampingly draw the connector flanges 23 and 24 into face butting engagement with respective steel spacer strips 29 extending the full length of the lateral marginal portions of flanges 23 and 24. Preferably the spacer strips are of a thickness approximating 0.03 times the overall length of the sleeve liner presently to be described and a width to extend laterally inwardly from the opposite lateral edges of flanges 23 and 24 a short distance past bolt passages 27 and are provided with bolt passages disposed to align with bolt passages 27 of flanges 23 and 24. When the nut and bolt assemblies 28 are fully tightened, the spacer strips form between them a gate passage chamber 30 open at its upper and lower ends as viewed in FIGS. 1 and 2, closed throughout the full length of the opposed lateral flange edges, and having a thickness in the axial direction of the stepped through passage defined by the axially spaced passages 25 and 26 of the assembled housings (See FIGS. 1 and 3) equal to the thickness of strips 29.

The opposite free ends of the assembled half housings 21 and 22 may be variously formed adapting the assembled structure for connection to any of the generally used pipeline connector fittings, for example 150 lb. ASTM flange (J Dia. Through bolts), plain nipple, victaulic nipple. In the preferred embodiment disclosed in the accompanying drawings, the opposite free end of housing half 21 is illustrated with a 150 lb. ASTM flange 31 with through bolt passages while the opposite free end of housing half 22 illustrates a plain nipple connector.

Turning for the moment to FIGS. 1 and 3, sealing of the gate valve of this invention is accomplished by means of a simple liner sleeve 32 slidably fitted into passage 25. As best seen from FIG. 3, illustrating the gate valve 20 in its fully open position before installation in a pipeline, sleeve 32 comprises a primary cylindrical body 33 of a soft elastomeric material (for example soft rubber of 45–50 Durometer on the Shore A scale). The upstream end 34 of sleeve 32 protrudes slightly from passage 25 of half housing 21 while the downstream end is externally circumferentially chamferred and internally recessed to form an axially protruding, flexible, annular sealing lip 35 of triangular cross section and a length to span gate passage 30 and abuttingly engage the opposing axially facing surface of connector flange 24 in surrounding relation to the upstream end of passage 26 of half housing 22. The internal recess includes a cylindrical counterbore 36 longitudinally inset from lip 35 and mounting in surface bonded relation an annular rigidifying ring 37 of elastomeric material (for example a hard rubber of 95–100 Durometer hardness on the Shore A scale). Rigidifying ring 37 is provided to prevent bodily inward deformation of soft rubber ring body 32 immediately adjacent the base of lip 35 during opening and closing movement of a plate-like gate 38 of tough abrasion and corrosion resistant material, for example, stainless steel dimensioned to snugly slidingly fit gate passage 30. Ring 37 and sleeve 32 cooperate to define a flow passage 26a of a diameter equal to passage 26 communicating with the upstream face of gate passage 30.

As will be clear from a consideration of FIGS. 1 and 9, the valve 20, when installed for use, is disposed in the line of flow from a pipeline flow passage 41 of a diameter equal to the smaller through passage 26 of half housing 22 which forms the downstream end of valve 20. As a consequence, when the valve 20 is drawn up, either by flange connector bolts 28 (FIG. 1) or straps and draw bolts in the spigot or take-off point valve usage of FIGS. 9 to 11, the rubber sleeve 32, due to its end butted engagement between face 42 (FIG. 1) of the pipeline fitting or flange and the face of connector flange 24 outwardly of passage 26, will be axially compressed into fluid tight sealing engagement at its opposite ends. As a consequence, leakage through gate passage 30 is prevented by the annular sealing lip 35 in the fully open position of the valve.

As best seen in FIG. 3, the leading end of plate-like gate 38 in the fully open valve position is disposed outwardly of annular sealing lip 35 and is formed to provide a knife edge 43. The tip 44 of knife edge 43 slidingly edges the face of connector flange 24 during its closing and opening movement and its bevelled upstream face is preferably inclined to define a minimal included tip angle. As gate 38 moves inwardly toward its closed position the knife edge tip 44 enters between the compressed sealing lip 35 and the opposing face of connector flange 24 progressively cammingly further compressing the soft deformable lip 35 into sealing engagement with the bevelled upstream knife edge face and finally the upstream planar face of gate 38. Due to the unique construction of lip 35 and the knife edge 43 of gate 38, a positive sealing engagement of sealing lip 35 in spanning relation to the entering knife edge 43 as well as the adjacently related end face of connector flange 24 and the entering upstream face of gate 38 is maintained at all times during closing and opening movement of gate 38.

It will furthermore be appreciated that the close sliding fit of gate 38 in gate passage 30 assures entry of knife edge 43 along the line of contact between lip 35 and the opposed face of connector flange 24 with its tip 44 in scraping contact with the face of connector flange 24. As a consequence, any corrosive or adherent matter that may be present on the opposed face of connector flange 24 will be scraped free during closing movement of the gate conditioning the flange face for proper sealing cooperation with lip 35 during its next opening movement. Also, since the sole leakage path of applicant's valve 20 lies between the compressed sealing lip 35 and the upstream face of connector flange 24 or the bevelled face of knife edge 43 and the upstream face of gate 38, the annular internal seal provided by the present invention obviates any need of packing, stuffing boxes, or packing glands for externally sealing the gate passage.

DESCRIPTION OF ACTUATORS

The basic valve structure heretofore described provides a gate valve which, most readily and inexpensively, may be provided for lever type, screw type, or air cylinder type actuation.

Referring for the moment to FIG. 4, an effective lever actuator is provided by providing a spacer strip 29a in the form of an angle iron. Flange 52 of angle iron 29a is of a thickness to serve as the left side spacer strip, of a width to extend outwardly beyond the left edge of connector flanges 23 and 24 to right angularly directed strengthening flange 53, and of a length approximately twice that of spacer strips 29. The inner edge of flange 52 disposed in guiding relation to the left edge of gate 38 as seen in FIG. 4 is provided with a series of space U-shaped notches 54 formed to journal a cross shaft 55 carried by the bifurcated end 56 of an actuator lever 57. Inwardly from end 56 lever 57 at 58 a depending link 59 the opposite end of which is fitted with a removable pivot pin 61 is provided adapting the opposite end of link 59 for connection to the outer end of gate 38 along its longitudinal center line upon fitting cross shaft 55 into a selected notch 54. Assuming gate 38 to be fully open as illustrated in FIG. 4, cross shaft 55 would be fitted to the outermost notch 54 and lever 57 would be rocked into position to align the pin passage at the opposite end of link 59 with the pin passage in the outer end of gate 38 and pivot pin 61 would be inserted to connect actuator lever 57 as shown in FIG. 4. In this position, the axis of shaft 55 lies in a horizontal plane bisecting the arc passing through the centers of pivots 58 and 61. Downward pressure applied to the free end of lever 57 will be applied to gate 38 through pivot pin 61 along the longitudinal center line of gate 38 to advance gate 38 toward its closed position a distance substantially equal to the distance between the centers of pivots 58 and 61. This movement will position the leading edge of gate approximately at the dot-dash line position 62 of FIG. 4 restricting through flow to about three-fourths of full flow. If further restriction of through flow is desired, pin 61 may be removed, shaft 55 may be fitted into the next lower notch 54, and pin 61 may be replaced to connect lever 57 for further inward movement of gate 38 to its half closed position or any desired increment of closure between three-fourths flow and half flow. It will be appreciated from the foregoing description of operation that the lever actuator may be employed to secure any desired through flow between full flow and no flow and that a single lever actuator may be employed to service any number of valves 20 fitted for lever operation.

Should it be desired to prove the gate valve 20 of this invention with a screw and handwheel actuator, this may be readily accomplished by removal of the upper-most bolt and nut assemblies 28 and attaching the four angle iron support standards 65 of the screw and hand-well actuator assembly 66 to the upper corners of connector flanges 23 and 24 as shown in FIGS. 5 and 6 by means of the longer bolt and nut assemblies 28a. As will be clear from FIGS. 5 and 6, actuator assembly 66 includes four angle iron support standards 65 the lower ends of which are provided with bolt passages 67 (FIG. 6) to receive the shanks of the bolts of nut and bolt assemblies 28a and the upper ends of which are interconnected in end butted assembly by angle iron tie plates 68. While tie plates 68 may be secured in any suitable manner to the upper ends of support standards 65 a welded connection (not shown) is preferred. The outwardly directed flanges 69 of tie plates 68 are each provided with bolt passages 70 (FIG. 5) equidistantly spaced from the ends of tie plates 68 and support in lateral spanning relation the support base 71 of a screw actuator assembly 72. As best seen in FIG. 6, support base 71 includes a square connector flange 73 and an upstanding cylindrical body 74. Support base 71 defines a stepped bore 75 the major diameter end of which opens downwardly through connector flange 73. The four corners of connector flange 73 are each provided with bolt passages 76 spaced to align with bolt passages 70 receiving the shanks of attachment bolt and nut assemblies 77 fixedly mounting support base 72 and actuator assembly 72 to tie plates 68.

Stepped bore 75 journals a stepped yoke sleeve 78 (FIG. 6) the larger flanged end 79 of which is housed in the major diameter portion of stepped bore 75 and the intermediate diameter portion 81 of which is journalled in the minor diameter portion of stepped bore 75. The minor diameter portion 82 of yoke sleeve 78 protrudes upwardly from support base 72, is threaded at its upper end at 83, and provided immediately inwardly of threaded end 83 with a Woodruff key way 84 the purpose of which will presently appear.

Yoke sleeve 78 is also provided with a stepped bore the upper minor diameter portion of which is internally threaded at 85 to receive an externally threaded, elongated, actuator screw or stem 86 depending downwardly and formed at its lower end with a bifurcated connector tip 87 dimensioned to receive between the bifurcations the medial portion of the upper end of gate 38. The bifurcated connector tip 87 and the received medial portion of gate 38 are through drilled to receive a headed connector pin 88 the shank of which at the end opposite the headed end is through drilled and fitted with a cotter pin 89 to secure stem 86 to gate 38.

The upwardly protruding minor diameter portion 83 of yoke sleeve 78 at its juncture with the upper end of the cylindrical body 74 of support base 71 mounts a thrust washer 91 supportingly engaging the end of hub 92 of a handwheel having four radially directed arms 94. Hub 92 is provided with a through bore dimensioned to closely encircle the minor diameter portion 82 of yoke sleeve 78 and is provided at 95 with an axially directed key way extending from end-to-end adapted to slidingly receive a Woodruff key 96 conventionally fitted in keyway 84 of yoke sleeve 78 prior to endwise assembly of hub 92 on yoke sleeve 78. A securing nut 97 threaded onto the threaded end of yoke sleeve 78 is provided to draw yoke sleeve 78 and handwheel hub 92 into assembled relation to support base 71 with thrust washer 91 operatively positioned to permit relative rotation of hub 92 and the cooperating end face of support base 71.

In order to move gate 38 from its fully closed position illustrated in FIGS. 5 and 6 handwheel 93 is rotated clockwise around the longitudinal axis of stem 86. Such clockwise rotation feeds stem 86 axially upwardly through yoke sleeve 78 drawing gate 38 upwardly with stem 86 since rotation of stem 86 is prevented by the pin connection of stem 86 with gate 38 constrained for sliding reciprocal movement in gate passage 30. Opposite counterclockwise rotation of handwheel 93, feeds stem 86 axially downwardly pushing gate 38 downwardly toward its illustrated fully closed position. From the foregoing description of actuator assembly 72 and its operation, it will be appreciated that valve 20 of FIGS. 1 through 3 may be readily fitted for screw and handwheel operation without any modification of the basic valve structure.

Figure 7:
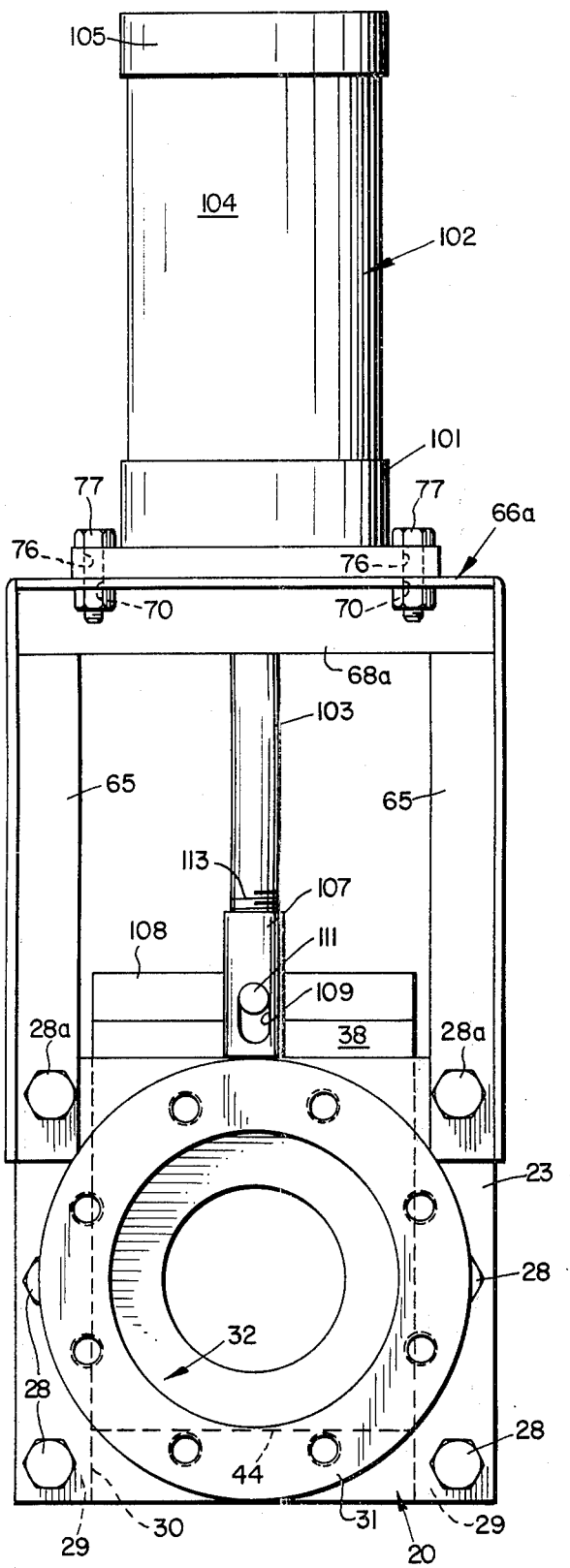
FIG. 7 is a left end elevational view of the valve of FIG. 1 assembled with an air cylinder actuator in accord with this invention.
Figure 8:
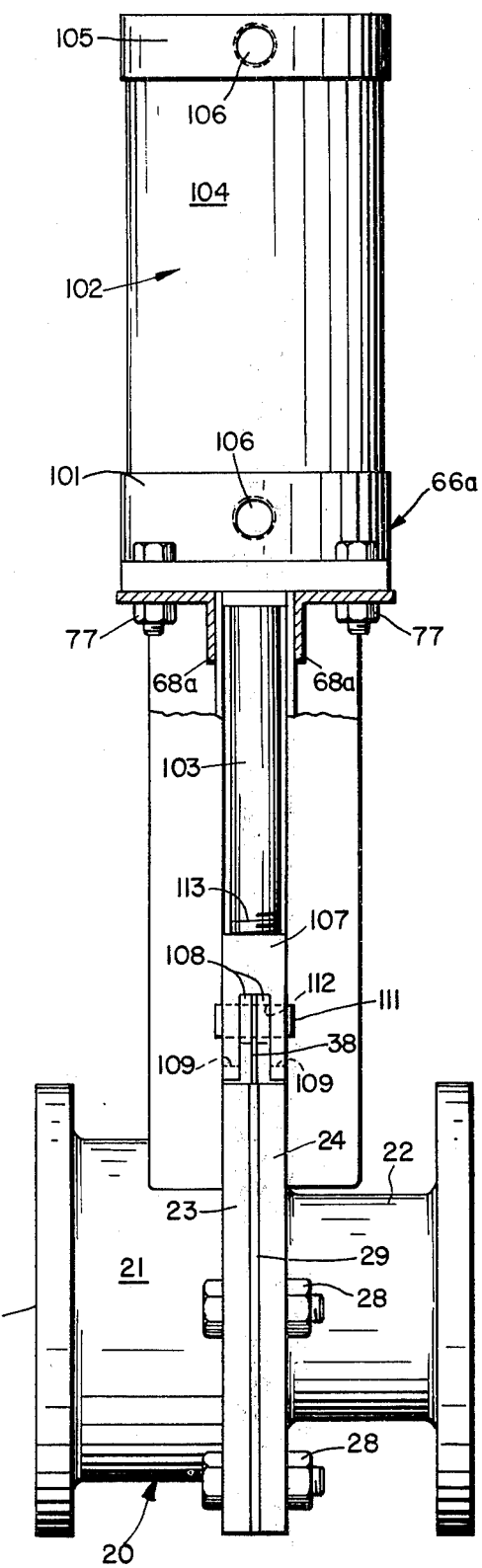
FIG. 8 is a side elevational view of the assembly of FIG. 7 with the near side angle irons of the mounting structure broken away to illustrate the mounting of the air cylinder actuator on the support structure.

Installation of an air cylinder actuator may also be readily accomplished without modification of the basic valve structure 20 as will be clear from a consideration of FIGS. 7 and 8. Here again removal of the uppermost bolt and nut assemblies 28 and attachment of angle iron support standards 65 of air cylinder actuator assembly 66a using longer bolt and nut assemblies 28a is all that is required. As will be clear from a comparison FIGS. 5 and 6 with FIGS. 7 and 8, the support standards 65 are differently oriented so as to dispose the laterally directed flanges in alignment with the outermost lateral edges of connector flanges 23 and 24 and longer angle iron tie plates 68a having wider mounting flanges are employed to accomodate the larger diameter square flanged mounting header 101 of air cylinder 102. The flanged mounting header 101 at its four corners and the wider flange of tie plates 68a are through drilled to provide aligned bolt passages 76, 70 to receive the shanks of attachment bolt and nut assemblies 77 fixedly mounting air cylinder 102 in centered spanning relation to tie plates 68a. Air cylinder 102, apart from the square flanged mounting header 101, is of conventional construction and provides a reciprocating piston (not shown) fixed to the upper end of piston rod 103 protruding downwardly through a conventionally sealed passage (not shown) formed in header 101 in coaxial relation to cylindrical piston chamber 104 of air cylinder 102. The opposite end of piston chamber 104 is closed by a header 105. Headers 101 and 105 are conventionally provided with air connection passages 106 (FIG. 8) adapting air cylinder 102 for connection to an air supply source (not shown) through conventional valving (not shown) adapted to supply air at a minimum 80PSI pressure selectively to header 101 or header 105 to effect the desired directional reciprocation of the piston and attached piston rod 103.

The lower end of piston rod 103 mounts a bifurcated connector fitting 107 the opposed arms of which are spaced apart as best seen in FIG. 8 to freely but closely receive the outer end of gate 38 which is preferably reinforced by laterally directed reinforcing strips 108 welded or otherwise permanently secured to the opposite marginal ends faces of gate 38. The opposed arms of connector fitting 107 are axially slotted at 109 (FIG. 7) to receive the opposite ends of a connector pin 111 fixedly secured as by welding in a through passage 112 (FIG. 8) drilled through the respective reinforcing strips 108 and the outer end margin of gate 38 in centered relation to the longitudinal axis of gate 38. Preferably the lower end of piston rod 103 is threaded as indicated at 113 to receive fitting 107 so the fitting can be adjusted axially to assure a proper clearance between its lower end and the opposing edges of connector flanges 23 and 24.

Assuming it is desired to open gate 38 shown in fully closed position in FIGS. 7 and 8 air is admitted through air connection 106 of header 101 to the lower end of cylinder 104 and air connection 106 of header 105 is vented to the atmosphere. The entering air under pressure fills the cylinder end below the piston and drives it and piston rod 103 toward header 105 against the minimal frictional resistance offered by the sliding piston and rod 103 with its air seal provided in header 101. Due to this minimal resistance to movement, the initial upward increment of movement is quite rapid until the lost motion provided by slot 109 and pin 111 disposed in the upper end of slot 109 is eliminated by the lower end of slot 109 engaging the ends of pin 111. This rapid movement results in a hammerlike upward directed blow being delivered to the ends of pin 111 and through pin 111 to gate 38 in advance of the continued upward movement of the piston, piston rod 103, fitting 107, pin 111 and gate 38 as a unit structure. This hammerlike blow is effective to break gate 38 loose in event it has, by reason of corrosive action or otherwise, become stuck in its previous set position. Upon reaching the new fully or partially open position, the air supply is cut off and the air connection 106 of header 101 is vented to the atmosphere equalizing the air pressure on the opposite sides of the piston. As a consequence, gate 38 will remain in its newly set position suspended from the ends of pin 111 engaged in the lower end of slot 109 and the lost motion provided by the slot and pin connection will be shifted to the opposite side of pin 111. In event the gate 38 is moved only to a partially open position, further opening movement may be effected, so long as the gate does not become stuck in its new position, without the delivery of a hammer blow merely by restoring the supply of pressurized air to air connection 106 of header 101. However, if sticking does occur, the freeing hammer blow may be effected merely by reversing the supply of air under pressure to connection 106 of header 105 and again reversing the supply to header 101. The same ability to deliver a hammer blow to free gate 38 for movement when it becomes stuck in any open position is provided by the described structure since the lost motion will always be disposed on the side of pin 111 opposite that last engaged by the slot end in the movement of the gate to its previous set position.

It will be further appreciated that this lost motion feature can be incorporated in either the lever actuator of FIG. 4 or the screw and hand wheel actuator of FIGS. 5 and 6 by providing the link 59 of the lever actuator or the lower end of actuator screw or stem 86 of the screw and hand wheel actuator with a slot connection 109 to their respective gate supported pins 61 and 88 as illustrated by FIGS. 15 and 16. While the delivered hammer blow will be of lesser magnitude in the last mentioned actuator mechanisms, they may be repeated a sufficient number of times to break the gate free in most, if not all, instances of gate sticking.

SPIGOT OR TAKE-OFF POINT USAGE

The valve 20 of this invention fitted with any of the previously described actuators and a 150 pound ASTM Flange for bolt connection may most conveniently be installed for spigot or take-off point usage by means of the pipeline saddle and draw bolt-strap mounting fittings disclosed in FIGS. 9 through 14 of this invention. Referring for the moment to FIGS. 9 through 11 where the lever actuated valve assembly of this invention is illustrated fitted to a sidewall opening 41 in pipeline 121, the fittings required are a saddle 122, a pair of securing straps 123 and four double shanked draw bolts 124 employed as corner connector bolts for connector flanges 23 and 24 and strap end connector bolts for clampingly securing saddle 122 and valve 20 in fluid communication with pipeline sidewall opening 41.

As best seen in FIGS. 9 and 12, saddle 122 comprises a cylindrical body having an axial passage 125, the diameter of which is equal to that of passages 26 and 26a of valve 20, a planar right angularly related end face 126 adapted for end butted engagement with flange 31 of valve 20, and an opposite concave end face 127 generated around a center located on the longitudinal axis of passage 125 at a radius equal to that of the outer peripheral wall of pipe line 121. Face 126 of saddle 122 is provided with a pair of diametrically opposite, axially directed, blind tapped passages 128 the axis of which, preferably lie in a plane containing the axis of passage 125 and disposed at right angles to the concavity of face 127. Passages 128 are fitted with respective protruding aligning studs 129 (FIGS. 9 and 12) adapted, when saddle 129 is fitted to flange 31 of valve 20, to enter freely into diametrically opposite bolt passages 131 of flange 31 (FIG. 9) and orient valve 20 so its gate passage 30 will be parallel to the flow passage 132 of pipe line 121 (See FIG. 11) in the final assembly of saddle 122 and valve 20 with pipe line 121.

To adapt saddle 122 and the associated valve 20 for assembly with pipeline 121, the four corner connector nut and bolt assemblies 28 of FIG. 2 are replaced by draw bolts 124. This replacement is effected by passing the threaded shanks 133 of draw bolts 124 through the corner bolt passages 27 of flanges 23 and 24 to engage the abutment nuts 134 threaded home on draw bolt shanks 133 into end butted engagement with flange 23 of valve 20 and threading the nuts of replaced nut and bolt assemblies up tight against flange 24 of valve 20. In the final tightening of the last mentioned nuts, the angularly related threaded shank 135, defining with shank 133 an included angle of the order of 135°, should be oriented to extend radially outwardly with respect to the axis of the corner bolt passages so they can be associated with the ends of straps 123 as will presently be pointed out.

Assembly with pipe line 121 is effected by lifting the loosely associated valve 20 and saddle 122 into position onto a flexible annular sealing gasket 130 positioned in surrounding relation to the sidewall passage in pipe line 121, encircling the midsection of the respective straps 123 around the pipe sidewall directly opposite the sidewall passage in pipe line 121, telescoping the tubular sleeve fittings 136 fixed to the outer face of the opposite straps ends by welding or other suitable means over the threaded shanks 135 of draw bolts 124, and threading draw nuts 137 onto shanks 135 to tension straps 123 around pipe line 121. Before and during final tightening of nuts 137, the alignment of gasket 130 and saddle 122 with the pipe line passage and the outer wall of pipe line 121 should be repeatedly checked to assure a leakproof clamping of gasket 130 between the outer wall of pipe line 121 and the concave end face of saddle 122.

Since continued tightening of nuts 137 tensions straps 123 around pipe line 121 drawing valve 20 and saddle 122 bodily toward pipe line 121, it will be appreciated that the protruding end 34 of sleeve 32 will be axially compressed into sealing engagement with face 126 of saddle 122 and gasket 130 will be sealingly clamped between concave face 127 of saddle 122 and the wall of pipe line 121 defining the pipe line sidewall passage. As a consequence, a leakproof assembly of valve 20 and saddle 122 with pipe line 121 is assured.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A packingless gate valve comprising a pair of body half housings defining respective through passages, said through passages of one body half housing being of appreciably greater diameter than that of the other body half housing and each half housing being provided at a respective end with outwardly directed bolt receiving connector flanges adapting said body half housings for end to end connection; a deformable sleevelike, elastomeric liner dimensioned to snugly fit in the larger through passage of said one body half housing and define a flow passage of a diameter substantially equal to that of said other body half housing, said liner at one end extends beyond the flanged end of said body half housing to provide a protuberant annular sealing lip; respective spacer strips of a thickness less than the axial projection of said annular sealing lip interposed between the opposed outer marginal portions of said connector flanges outwardly of said liner; respective bolt and nut assemblies disposed in said bolt receiving connector flanges and adapted, upon tightening, to draw the connector flanges of said body half housings together into clamping engagement with said spacer strips to form between said spacer strips a laterally directed gate passage and to also compress said annular sealing lip into sealing engagement with the flange face of said other body half housing outwardly of its smaller diameter through passage; a plate-like gate disposed in said gate passage for guided reciprocal movement in said gate passage and formed at its leading end to enter between said annular sealing lip and said flange face of said other body half housing upon inward closing movement of said gate to progressively shift said protuberant sealing lip into sealing engagement with said gate.

2. The combination of claim 1 wherein said protuberant annular sealing lip comprises a longitudinally and radially inwardly chamfered peripheral wall originating at the terminus of the cylindrical outer wall of said sleeve-like liner and a longitudinally and radially outwardly directed wall intersecting said chamfered peripheral wall outwardly of the flow passage defined by said liner to define an annular line-like sealing tip.

3. The combination of claim 1 wherein said sleeve-like liner at said one end radially inwardly of said protuberant annular sealing lip is provided with an annular recess opening into the flow passage defined by said liner and a hard rubber ring is disposed in said annular recess bonded to the walls of said annular recess to rigidify said liner adjacent the base of said protuberant annular sealing lip to localize bodily deformation of the soft rubber liner to the protuberant annular sealing lip.

4. In a gate valve, two hollow housing members having coaxial cylindrical passages of different diameter and rigidly secured together end to end with axial spacer means between them defining a relatively narrow transverse gate receiving and guiding space disposed normal to said passages, a cylindrical sleeve of greater axial length than said space substantially wholly lining the larger diameter one of said passages and having at one end an annular resilient end lip that in the valve open position extends through said space into sealing engagement with an axially facing surface of the other housing member, the internal diameter of said sleeve being substantially equal to the diameter of the passage in said other housing member, and a gate member having an imperforate portion slidable in said space between a valve closed position wherein it blocks flow through said valve and a valve open position wherein it permits unobstructed flow through said valve, said lip being sufficiently resilient to permit sliding movement of the gate member between said positions and being compressed in resilient sealing engagement with the upstream side of said gate member in the valve closed position.

5. In the gate valve defined in claim 4, said gate member being a flat imperforate plate having substantially sliding clearance with the adjacent ends of said housing members.

6. In the gate valve defined in claim 5, said spacer means comprising flat rigid strips clamped between said housing members and defining guide means for said gate.

7. In the gate valve defined in claim 4, said sleeve being an integral resilient element maintained under axial compression in said valve.

8. A packingless gate valve comprising two body housing members having coaxial through passages, the passage of one housing member being of appreciably greater diameter than that of the other, means securing said housing members together in end to end relation with rigid spacer means therebetween to define a relatively narrow transverse gate chamber, an annular sleeve snugly lining the larger passage to define in said one housing member a coaxial flow passage of a diameter substantially equal to that of the passage in said other housing member, said sleeve extending through said chamber in the form of an annular resilient lip adapted to sealingly engage an axially facing surface on said other housing member in the open position of said valve, a gate slidable through said chamber between a valve open position where it does not block fluid flow through said passages and a valve closed position wherein it is interposed between said sealing lip and said axially facing surface.

9. The packingless gate valve defined in claim 8, wherein said sleeve is an integral elastomeric element and means is provided for maintaining said element in axial compression.

10. The packingless gate valve defined in claim 8, wherein said axially facing surface is substantially planar and normal to the flow axis and said gate is slidable across said surface.

11. The packingless valve defined in claim 8, wherein said spacer means comprises flat rigid strips clamped between the housing members at opposite sides of the gate chamber, said strips being spaced apart a distance greater than the diameter of said annular lip and serving to slidingly guide said gate between open and closed positions.

12. In a gate valve, two hollow housing members having coaxial cylindrical passages of different diameter and rigidly secured together end to end with axial spacer means between them defining a relatively narrow transverse gate receiving and guiding space disposed normal to said passages, an annular sleeve of greater axial length then said space lining the larger diameter one of said passages and having at one end an annular resilient end lip that in the valve open position extends through said space into sealing engagement with an axially facing surface of the other housing member, the internal diameter of said sleeve being substantially equal to the diameter of the passage in said other housing member, a reinforcing ring within said sleeve adjacent said lip, and a gate member having an imperforate portion slidable in said space between a valve closed position wherein it blocks flow through said valve and a valve open position wherein it permits unobstructed flow through said valve, said lip being sufficiently resilient to permit sliding movement of the gate member between said positions and being compressed in resilient sealing engagement with the upstream side of said gate member in the valve closed position.

13. In the gate valve defined in claim 12, said ring being of a resilient material of greater hardness than said sleeve whereby the ring maintains the configuration of the softer sleeve while the valve is being opened and closed.

* * * * *